J. L. SWINEFORD AND T. J. MORGAN.
AUTO WING AIR DEFLECTOR.
APPLICATION FILED MAR. 22, 1922.
1,437,276.
Patented Nov. 28, 1922.
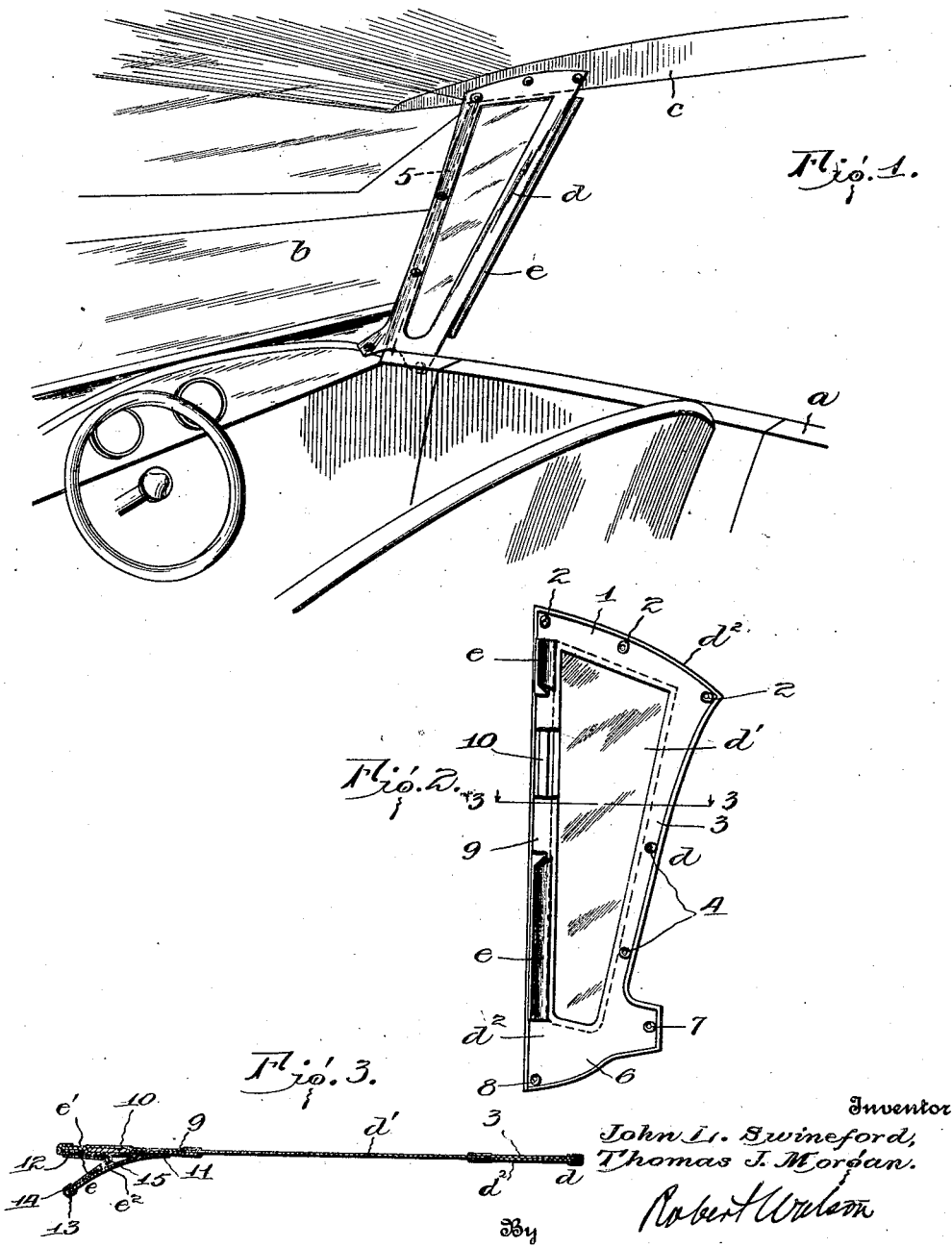

Patented Nov. 28, 1922.

1,437,276

UNITED STATES PATENT OFFICE.

JOHN L. SWINEFORD AND THOMAS J. MORGAN, OF SCRANTON, PENNSYLVANIA.

AUTO-WING AIR DEFLECTOR.

Application filed March 22, 1922. Serial No. 545,743.

*To all whom it may concern:*

Be it known that we, JOHN L. SWINEFORD and THOMAS J. MORGAN, citizens of the United States, residing at Scranton, in the county of Lackawanna and State of Pennsylvania, have invented certain new and useful Improvements in Auto-Wing Air Deflectors, of which the following is a specification.

This invention relates to an improved wind shield wing, and the purpose of the invention is to provide a flexible wing having means for deflecting the air current outwardly, from the automobile, so that it will not strike against the backs of the occupants of the front seat thereof, as occurs with the wind shield wings in common use. The wing made in accordance with our invention comprises a sheet of transparent material and a frame of flexible material surrounding and supporting the same, the upper, front and lower portions of the frame having means for attachment to the top, wind shield frame, and body of the vehicle, and the rear part of the frame having an outwardly projecting flange or rib serving as an air deflector. This air deflector is preferably formed by a strip of flexible material attached to the side of the wing and folded so as to project outwardly therefrom, and in the wing we provide a stiffening bar which serves as a backing for the rib and prevents it from being turned inwardly by the air pressure.

In the drawing,

Fig. 1 is a perspective view of part of an automobile body, top and wind shield, looking forwardly and toward the right hand end of the latter and showing one of the wings attached;

Fig. 2 is a side view of the right hand wing partly broken away; and,

Fig. 3 is a section on the line 3—3 of Fig. 2.

Referring to the drawing, $a$ represents the body of an automobile, $b$ represents the wind shield, and $c$ indicates the top. A wind shield wing made in accordance with our invention, is shown at $d$, attached to the body, the supporting frame of the wind shield, and the top of the automobile.

As shown in Figs. 2 and 3, the wind shield wing comprises a transparent sheet $d'$, which may be of celluloid, arranged within a frame of flexible material $d^2$, which may be any suitable weather-proofed fabric. This frame, as shown in Fig. 3 of the drawing, consists of two layers of fabric sewed together and to the transparent sheet. The form of the wing may vary according to the structure of the automobile to which it is to be applied. In the drawing, the wing has a somewhat triangular shape. The upper part 1 of the wing is provided with eyelets 2, for attachment to buttons on the top of the automobile; the front part 3 is provided with eyelets 4, for attachment to buttons on the upright post 5 of the wind shield support, and the lower part 6 of the wing is provided with an eyelet 7, for engaging a button on the dash, and with an eyelet 8 for attachment to a button on the outer side of the body, adjacent the wind shield. The general form of the wing and the attaching devices are common to other wind shield wings. Between the layers of fabric, in the rear part 9 of the flexible frame, we enclose a flat stiffening bar 10, which may be of wood or metal, and this bar extends to points near the top and bottom of the wing. On the outer side of the part 9 of the frame, we attach a rib $e$, of flexible material, which forms a deflector for deflecting the air outwardly, at the rear edge of the wing. The deflector, as shown, consists of a strip of fabric extending practically the full length of the part 9 of the frame and sewed at one edge 11 to said part 9, between the transparent sheet or window $d'$ and the stiffening bar 10, and sewed at its opposite edge 12 to the part 9, adjacent the rear edge of the latter. Prior to attaching the strip to the wing, the strip is folded upon itself longitudinally along its central line, as shown at 13, and a suitable binder 14 is laid along the bend and the folds and binder are stitched together at the bend. The rear half $e'$ of the strip is creased longitudinally, as shown at 15, so that it assumes a V-shape in cross section with its apex lying between the part $e^2$ of the strip and the stiffening bar 10. With this arrangement, the part $e'$ serves to hold the part $e^2$ outwardly from the wing so that the latter will cause deflection of the air.

The stiffening bar lessens or prevents the vibration of the rear edge of the wing and forms a backing for the deflector which prevents the deflector from being turned inwardly by the air current. The wing, with the exception of the rear part, is flexible throughout and may be readily applied or taken down and rolled. When in use, the air is thrown outwardly by the deflector and does not return against the backs of the heads of the occupants of the car, as would occur if the deflector were omitted.

While we have shown in the drawing, a wing with deflector for the right hand side of the automobile, it will be understood that a similar wing will be applied to the left hand side adjacent the wind shield, the deflector for the left hand wing being placed upon the opposite side of the part 9 of the frame from that shown in the drawing. The deflector is preferably made of flexible material, having sufficient stiffness to hold its shape, but it may be made of rigid material, if desired.

What we claim is:

1. A wind-shield wing comprising a sheet of transparent material and a frame of flexible material surrounding and supporting the same, said frame comprising upper, front and lower portions adapted for attachment to the top, wind-shield frame and body of the automobile, and a rear portion having an outwardly projecting flange or rib, extending longitudinally thereof and serving as an air deflector.

2. A wind-shield wing comprising a sheet of transparent material and a frame of flexible material surrounding and supporting the same, said frame comprising upper, front and lower portions adapted for attachment to the top, wind-shield frame and body of the automobile, and a rear portion having a flexible outwardly projecting flange or rib, extending longitudinally thereof and serving as an air deflector.

3. A wind-shield wing comprising a sheet of transparent material and a frame of flexible material surrounding and supporting the same, said frame comprising upper, front and lower portions adapted for attachment to the top, wind-shield frame and body of the automobile, and a rear portion having a stiffening bar extending longitudinally thereof and an outwardly projecting flexible flange or rib extending parallel with said bar.

4. A wind-shield wing for automobiles having its front portion adapted for attachment to the frame of the windshield, and having an air deflector adjacent its rear edge, said deflector comprising a strip of flexible material secured along its edges to the wing and having a central longitudinal fold, the part of said strip at the rear of said fold being folded under the part at the front of said fold.

5. A flexible wind-shield wing for automobiles having its front portion adapted for attachment to the frame of the wind-shield and having a stiffening bar in its rear portion, and an air deflector secured to said rear portion parallel with said bar, said deflector comprising a strip of flexible material secured at its edges to the wing and having a central longitudinal fold, the part of the strip at the rear of said fold being folded under the part at the front of said fold.

In testimony whereof we affix our signatures.

JOHN L. SWINEFORD.
THOMAS J. MORGAN.